United States Patent [19]
Slater

[11] Patent Number: 5,399,122
[45] Date of Patent: Mar. 21, 1995

[54] BALLOON WITH ACCOMPANYING HELIUM SUPPLYING CARTRIDGE

[75] Inventor: Thomas Slater, Portsmouth, N.H.
[73] Assignee: Aerobal Corp., Portsmouth, N.H.
[21] Appl. No.: 1,284
[22] Filed: Jan. 7, 1993
[51] Int. Cl.[6] .............................................. B64B 1/50
[52] U.S. Cl. ...................................... 472/51; 472/134; 116/210; 116/DIG. 9; 446/220
[58] Field of Search ......................... 472/51, 54, 134; 446/220, 221, 224; 116/210, DIG. 8, DIG. 9; 222/3, 509, 501, 559

[56] References Cited

U.S. PATENT DOCUMENTS

| | | | |
|---|---|---|---|
| 3,174,455 | 3/1965 | Peterson | 446/220 |
| 3,310,024 | 10/1965 | McConnell | 116/124 |
| 3,729,847 | 5/1973 | Chandos | 40/125 |
| 3,754,731 | 8/1973 | Mackal et al. | 251/145 |
| 3,771,247 | 11/1973 | De Harak | 40/152 |
| 3,941,079 | 3/1976 | McNeil | 116/DIG. 9 |
| 4,088,162 | 5/1978 | Rossi | 116/210 |
| 4,135,325 | 1/1979 | Lehman | 46/74 |
| 4,167,204 | 9/1979 | Zeyra | 446/220 |
| 4,391,063 | 7/1983 | Gill, III | 46/90 |
| 4,524,885 | 6/1985 | Zimmerly | 222/5 |
| 4,586,456 | 5/1986 | Forward | 446/220 |
| 4,791,954 | 12/1988 | Hasegawa | 137/487.5 |
| 4,813,902 | 3/1989 | Messer | 446/71 |
| 4,836,128 | 6/1989 | Walker | 116/210 |
| 4,903,958 | 2/1990 | DiCarlo et al. | 272/27 |
| 4,917,646 | 4/1990 | Kieves | 446/224 |
| 5,009,624 | 4/1991 | Estam-Goggin | 446/71 |
| 5,042,697 | 8/1991 | Warren | 222/402.1 |
| 5,049,106 | 9/1991 | Kim et al. | 446/220 |
| 5,083,771 | 1/1992 | Tyner | 272/27 |
| 5,108,337 | 4/1992 | Sloan et al. | 446/220 |

Primary Examiner—Carl D. Friedman
Assistant Examiner—Kien T. Nguyen
Attorney, Agent, or Firm—Hayes, Soloway, Hennessey, Grossman & Hage

[57] ABSTRACT

A novelty item is provided comprising a balloon, a container adapted to contain the balloon in a deflated state, and an inflation device adapted to act on the balloon. The inflation device includes a high pressure gas container and a valve coupled to the gas container. The valve is adapted to self-regulate and control the flow of gas into the balloon upon actuation thereof.

10 Claims, 2 Drawing Sheets

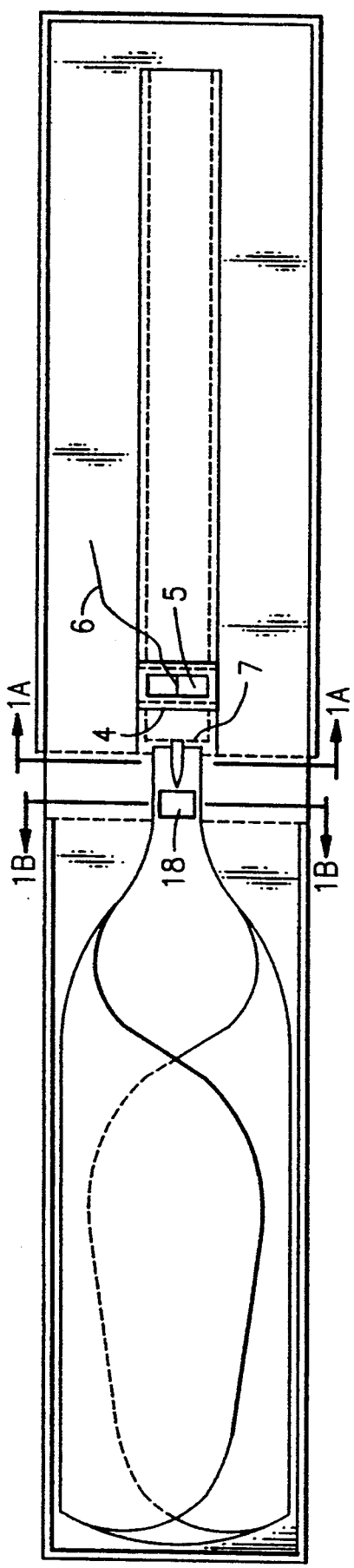
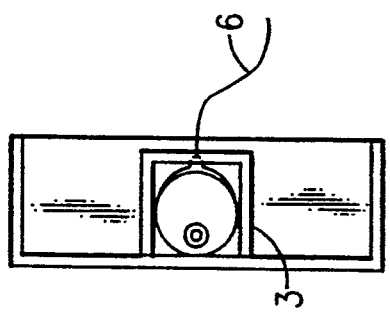
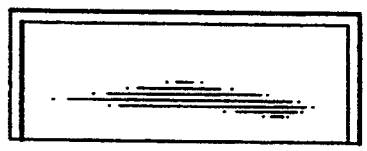
FIG. 1
FIG. 1A
FIG. 1B

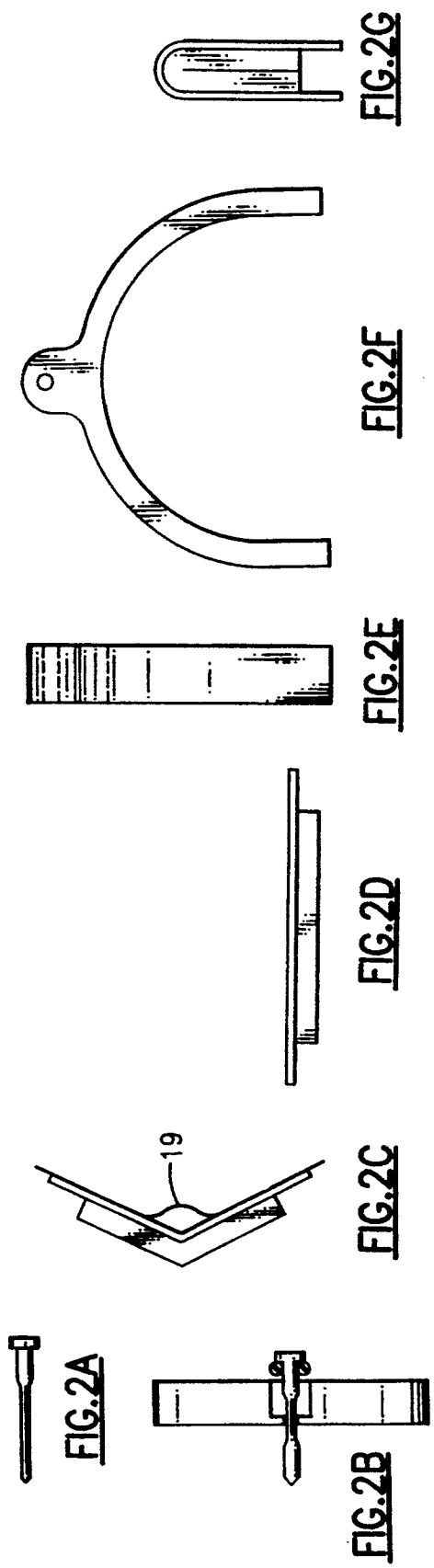
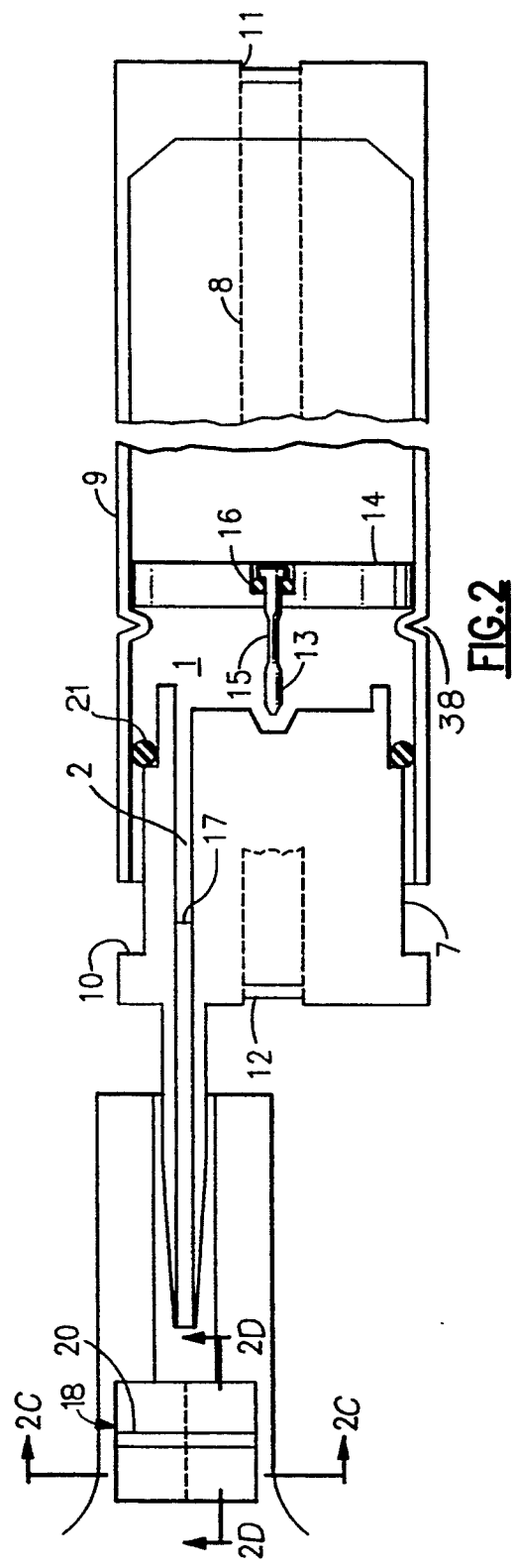

BALLOON WITH ACCOMPANYING HELIUM SUPPLYING CARTRIDGE

FIELD OF THE INVENTION

The invention relates to the field of novelty items and, in particular to a novelty item in which a concealed deflated object is expanded and placed into view.

BACKGROUND OF THE INVENTION

Helium filled balloons are very popular throughout much of the world for festive occasions such as birthday parties or for celebrations of milestone events such as graduations from school. They are mostly purchased in stores in the inflated condition. This means that it is cumbersome to transport them home, as in a car, especially when several balloons are involved. It also complicates the effort to achieve surprise in the presentation of the balloon to the recipient. It is possible to rent tanks of helium or to even purchase small tanks of helium for inflation of balloons at home but this is cumbersome and most consumers are not willing to go to the trouble of doing this. Prior to the invention disclosed herein, others have suggested devices wherein balloons are automatically inflated with compressed gas from associated containers. One of the more recent disclosures, U.S. Pat. No. 5,083,771 to Tyner, describes a novelty item comprising an inflatable object and a container adapted to contain said inflatable object in a deflated state and an inflation means adapted to act on said inflatable object for causing said inflatable object to rapidly expand beyond the bounds of the container. Dicarlo, however, unlike the present invention, teaches the criticality of a valve means coupled directly to a high pressure gas container, so that the valve can rapidly delivery high pressure gas for said rapid expansion.

Other disclosures dealing with the concept of novelty balloons, automatically inflating balloon devices, and valves designed for such use include U.S. Pat. Nos. 5,108,337; 5,049,106, 5,009,624; 4,917,646; 4,903,958; 4,813,902, 4,391,063; 4,219,819; 4,135,325; 3,754,731; and 3,310,024.

These prior patents do not suggest the idea of the present invention, namely providing a concealed deflated object which is expanded through the use of a self-contained and self-regulating gas filling valve means construction, which delivers the gas first from a high pressure cylinder into a low pressure chamber, and then into the balloon.

The advantages of a self-contained and self-regulating gas filling valve means also allows for (unlike the prior art mechanisms) the use of a relatively small sized balloon (expanded size of 10 inches or less) of relatively light-weight material (such as polypropylene film). Note that a self-contained balloon helium system, in order to be saleable to the public at a reasonable price, is limited to a relatively small amount of helium (since the container for the high pressure helium represents the principal cost and is proportional to the amount of helium contained). A small amount of helium implies a small balloon. If a small balloon is to float, it must be much lighter than the nylon materials used in the so-called Mylar (and larger sized) balloons presently sold (latex is totally too heavy). Light materials are very weak compared to the nylon type materials commonly used in larger balloons. Rapid expansion, as described in U.S. Pat. Nos. 4,903,958 and 5,083,771, puts too much stress on the balloon neck of weak material. Thus, the high-pressure delivery described in the '958 and '771 disclosures, unlike the present invention, have not proved able to provide a truly commercially successful small-sized floating helium balloon.

Thus, it is a primary object of the present invention to provide a new novelty item in which a balloon of a selected configuration is concealed and inflated slowly by a controlled gas flow which throttles the flow of said gas into the balloon thereby minimizing the possibility that the balloon might burst, or be broken away, from the valve filling mechanism.

SUMMARY OF THE INVENTION

A novelty item is provided comprising an inflatable object, a container means adapted to contain said inflatable object in a deflated state, and an inflation means adapted to act on said inflatable object, said inflation means including a high pressure gas container and valve means coupled to said gas container, said valve means being adapted to self-regulate and control the flow of gas into said inflatable object upon actuation thereof. In a preferred embodiment, said valve means comprises a slidably mounted nozzle sealingly engaged within a high pressure gas cartridge including a channel for gas delivery and a valve pin sealingly engaged within said high pressure cartridge extending outwardly from said cartridge for contacting said nozzle, and means for sliding said nozzle inwardly to contact said pin to release the gas.

BRIEF DESCRIPTION OF THE DRAWINGS

FIG. 1 shows, in approximately half-scale, the plan view of the package for the subject balloon system.

FIG. 2 is a perspective view of the inflation means of the present invention.

FIG. 2A shows an alternate valve pin configuration where the reduced diameter portion is continued to the end of the pin.

FIG. 2B shows a preferred valve pin in which the reduced diameter portion is intermediate between two portions of the pin having essentially the same, larger diameter.

FIG. 2C, taken along line 2C—2C, shows the plastic film bubbling up and forming a channel.

FIG. 2D shows a cross section along line 2D—2D.

FIGS. 2E and 2F show the spacer.

FIG. 2G shows the bent and creased balloon neck.

DETAILED DESCRIPTION OF THE INVENTION

FIG. 1 shows, in approximately half scale, the plan view of the package for the subject balloon system; it is shown in the opened position where the top of the carton has been raised off the bottom and swung so as to have pivoted with the aid of the right end wall which acts like a hinge. Thus, both top and bottom of the carton are shown lying on a horizontal surface.

In the bottom of the carton we see the uninflated balloon (which is about 10½ inches in diameter) folded lengthwise roughly in thirds contained within the bottom's walls. The neck of the balloon extends across the right end wall of the carton (which is now lying flat). The tubular extension of the sliding nozzle, 7, has been inserted into the narrow passageway in the center of the balloon's neck, and sealed with a viscous (non hardening) substance such as silicone grease. This provides a seal so that when helium is passing from chamber 1 through channel 2 (see FIG. 2) and then into the neck of the balloon it will not leak out of the nozzle/neck joint, yet it will allow the balloon, after inflation, to be pulled off the nozzle.

The cartridge (sometimes referred to as the cylinder) of helium is contained in a portion of the top of the carton having a square cross section, as seen in FIG. 1A. This containment for the cartridge is made of corrugated cardboard or material of equivalent stiffness, essentially the same material as the rest of the carton. The cartridge is hidden from the user by the containment (there is an end wall at either end of this containment to prevent the cartridge from sliding out, which walls are not shown; the right end wall could be the same as the end wall of the top half of the carton, depending on the length of the cartridge, which is arbitrary). There is a slot in the top of the containment which allows the spacer 5 to be pulled upward by pulling upward on attached ribbon 6.

Spacer 5, when in place partially surrounding nozzle 7 prevents nozzle 7 from moving toward cartridge 9, as it is urged to do by rubber band 8 which extends lengthwise around the cartridge and the nozzle and is seated respectively in cartridge groove 11 and nozzle groove 12. When spacer 5 is withdrawn upward through slot 4 nozzle 7 is drawn further into the cartridge pushing valve pin 13 inward through end plug 14. The necked down section of the valve pin, 15, is thus placed within O-Ring 16, and helium is released into chamber 1. The helium travels through channel 2 and through a small hole (whose diameter is determined empirically) in wall 17, which wall may be located anywhere along the length of 2, at the convenience of the mold builder (nozzle 7 can be a molded plastic part or a white metal die cast part). The helium then travels through the neck and into the body of the balloon.

The hole in wall 17 throttles the flow of helium into the neck of the balloon. If the helium were to flow too quickly, there is a danger that the neck will be broken from too much pressure, and it is easier to create a controlled flow by such a hole than by trying to control the flow with the diameter of the valve pin neck with relation to the O-ring and the hole in 14. This is especially so since it is desirable to have the clearance around the neck of the valve pin, in relation to the hole in the left side of the end plug 14, as large as possible to allow for fast filling of the cartridge with helium. Note that during the filling of the cartridge with helium, valve pin 13 is positioned far enough to the right to cause O-ring 16 to be forced rightward by the incoming gas so as to allow free passage of the helium into the cartridge (see FIG. 2B). After filling the valve pin is positioned leftward, as shown in FIG. 2.

If the flow of helium around the valve pin neck is much faster than can go through the hole in 17, pressure starts to build in chamber 1, forcing nozzle 7 leftward against the force exerted by the rubber band, allowing the pressure within the cartridge 9 to push the valve pin leftward, restricting the flow around the valve pin, lowering the pressure in chamber 1.

Accordingly, the size of the opening in 17, and the retractive force of the rubber band can be adjusted to regulate the flow of gas into the balloon.

It should be noted that the balloon shown partially at the left side of FIG. 2 is shown rotated 90 degrees about the axis through channel 2 from the orientation it actually has which is shown in FIG. 1.

Section 2C—2C shows the V shaped condition of that portion of the neck of the balloon prior to and during inflation. An aluminum tape has been applied (one side has a pressure sensitive adhesive) to the bottom of the neck. Bending the neck in a V allows the plastic film to bubble up forming a channel through which the helium can pass easily. Since the aluminum tape is approximately 2 to 3 mils thick, and the plastic film is only 0.7 mil thick, and much less stiff, without such a V the flow resistance is greater and back pressure is built up to the right of the tape.

As the balloon inflates, it unfolds itself and rises out of the bottom half of the carton, pivoting about its connection to the nozzle.

After the balloon has been inflated, it is grasped between thumb and forefinger just to the right of the tape and pulled away from the nozzle. The taped section is then flattened out with the fingers (the V shape is removed) and it is bent sharply along line 20 (printed on the tape in contrasting color). This kink, as in a garden hose is then sharply creased between forefinger and thumbnail and, because of the relative stiffness of the tape compared to the plastic balloon film, the creased neck maintains its shape and prevents the leakage of helium, as the kinked hose prevents the flow of water. The neck of the balloon is bent and creased such that the aluminum tape is on the interior of the kinked section—leaving the two sheets of plastic that, together, form the neck—stretched against each other on the outside of the kink. See FIGS. 2D and 2G.

A ribbon is included in the carton, one end of which is adhesively attached to the neck of the balloon. The ribbon is long enough so that the ribbon and the balloon together will be heavy enough to prevent the balloon from floating away.

Details of Construction of the Cartridge and Nozzle Assembly

The cartridge is preferably cylindrical, and is preferably of metal and is shown in the shape achieved by impact extrusion. End plug 14 is preferably a cylindrical disk which is glued in place with a high performance adhesive. It is advantageous to start with a liberal clearance between the O.D. of the plug and the I.D. of the cylindrical cartridge, with glue on their mating surfaces, and then force them together by uniformly applied pressure applied radially inward on the O.D. of the cartridge. At the same time, or less desirably in a subsequent operation, the cartridge is necked as shown at 38 just outboard of the plug, providing a mechanical safety in case the adhesive joint gives way.

As an alternate to an impact extrusion for the cartridge, it may be constructed by using a section of tubing having a solid end plug (in place of the bottom of the impact extrusion) which is glued in place in a manner similar to that used for the left end plug. If this method is used the groove for seating the rubber band would be provided by either a secondary machining operation or adding a molded plastic cap with such a groove.

Valve Pin 13 is merely a pin (metal or plastic) with a necked down section and a head at one end (an alternate construction is shown in FIG. 2A). The other end has a conical taper to facilitate assembly. The seal to contain the helium in the cartridge is formed by the action of the O-ring squeezed between the I.D. of the walls of the hole in the end plug and the O.D. of the valve pin while simultaneously being pressed against the shoulder of the hole in the end plug by the high pressure gas in the cartridge and by the head of the pin as it is pressed leftward by that same high pressure gas.

Chamber 1 is sealed (so as to prevent leakage to the outside when helium flows from the cartridge past the valve pin into chamber 1 and then into channel 2 and the neck of the balloon) by rubber O-ring 21. The O-ring rests against a shoulder of the nozzle and is not restrained in a circumferential groove, as the nozzle must only move inward once.

The balloon consists of an upper and lower sheet of plastic film each of which has a thin layer of aluminum (which greatly retards the transmission of helium, and which gives it a lustrous, silvery appearance) and a heat sealable layer. The two sheets are heat sealed together at their borders. The plastic film must be lightweight because the volume of the balloon is small, approximately 200 cubic inches, and therefore has very low lifting force. It must have high strength at the heat sealed joints. It also must have a low permeability with regard to helium and should exhibit an ability to stretch so that it looks pleasing in the inflated condition, typically an oblate sphere, whereas before inflating it is flat. Many materials were considered and one that best meets these specifications is a polypropylene film, catalog #70 MET-HB made by Mobil Chemical Company.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

I claim:

1. A novelty item comprising:
an inflatable object;
a container means adapted to contain said inflatable object in a deflated state;
a high pressure gas container; and
a self-regulating valve means communicating with said inflatable object and said high pressure gas container through a pressurized gas chamber wherein said valve means both releases gas from the pressurized container into the pressurized gas chamber and regulates the flow of gas into the inflatable object at a preselected rate that is essentially independent of the pressure in the high pressure gas container.

2. The novelty item of claim 1 wherein said valve means comprises a slidably mounted nozzle sealingly engaged to the high pressure gas container wherein said nozzle includes a channel for gas delivery and a valve pin sealingly engaged within said high pressure container extending outwardly from said container for contacting said nozzle, and means for sliding said nozzle inwardly to contact said pin to release the gas.

3. A novelty item comprising:
an inflatable object;
a container means adapted to contain said inflatable object in a deflated state; and
inflating means adapted to act on said inflatable object, said inflation means including a high pressure gas container and valve means coupled to said gas container, said valve means adapted to self-regulate and control the flow of gas into said inflatable object upon actuation thereof; and wherein,
said valve means comprises a slidably mounted nozzle sealingly engaged to the high pressure gas container in which said nozzle includes a channel opening for gas delivery and a valve pin sealingly engaged within said high pressure container extending outwardly from said container for contacting said nozzle, and means for sliding said nozzle inwardly to contact said pin to release the gas.

4. A novelty item according to claim 3, wherein the channel opening is adjusted to regulate gas delivery.

5. A novelty item according to claim 3, wherein the means for sliding said nozzle inwardly is an elastic band extending around the outer side of both the cartridge and the nozzle thereby driving the nozzle inwardly to engage the valve pin to release the high pressure gas.

6. A novelty item according to claim 5, wherein the contractive force of the elastic band is adjusted to control the inward engagement of the nozzle with the valve pin for the release of high pressure gas.

7. Valve means coupled to a high pressure gas container and being adapted to self-regulate and control flow of gas into an inflatable object upon actuation thereof, said valve means comprising a slidably mounted nozzle sealingly engaged to a high pressure gas container wherein said nozzle includes a channel opening for gas delivery and a valve pin sealingly engaged within said high pressure container extending outwardly from said container for contacting said nozzle, and means for sliding said nozzle inwardly to contact said pin to release the gas.

8. Valve means according to claim 7 wherein the channel opening is adjusted to regulate gas delivery.

9. Valve means according to claim 7, wherein the means for sliding said nozzle inwardly is an elastic band extending around the outer side of both the container and the nozzle thereby driving the nozzle inwardly to engage the valve pin to release the high pressure gas.

10. Valve means according to claim 9, wherein the contractive force of the elastic band is adjusted to control the inward engagement of the nozzle with the valve pin for the release of high pressure gas.

* * * * *